United States Patent [19]

Staschover et al.

[11] Patent Number: 5,095,291

[45] Date of Patent: Mar. 10, 1992

[54] COMMUNICATION FILTER FOR UNSHIELDED, TWISTED-PAIR CABLE

[75] Inventors: Leo Staschover, Syosset; Prem G. Chandran, Nesconset, both of N.Y.

[73] Assignee: North Hill Electronics, Inc., Glen Cove, N.Y.

[21] Appl. No.: 611,062

[22] Filed: Nov. 8, 1990

[51] Int. Cl.$^5$ .............................................. H04B 3/28
[52] U.S. Cl. ................................... 333/12; 333/177; 333/181; 375/36
[58] Field of Search ................. 333/12, 177, 180, 178, 333/179, 181, 25; 361/119; 379/416, 417; 375/36

[56] References Cited

U.S. PATENT DOCUMENTS 4,326,287  4/1982  Abramson ........................... 375/36 X
4,751,607  6/1988  Smith .................................. 333/25 X
4,766,402  8/1988  Crane ..................................... 333/25

Primary Examiner—Eugene R. LaRoche
Assistant Examiner—Seung Ham

[57] ABSTRACT

An electrical data filter is provided for reducing noise reception and generation for data signal which is transmitted differentially on two conductors constituting the twisted-pair cable. The data filter includes an in-line transformer and a shunt transformer. The in-line transformer has a winding (i.e. the primary or secondary) in series with each line of the twisted pair. These windings are arranged so that they are wound in the same direction. Similarly, the shunt transformer includes a winding which shunts each wire of the twisted pair to ground through a series capacitor. These shunt windings are wound in opposite directions to each other.

1 Claim, 1 Drawing Sheet

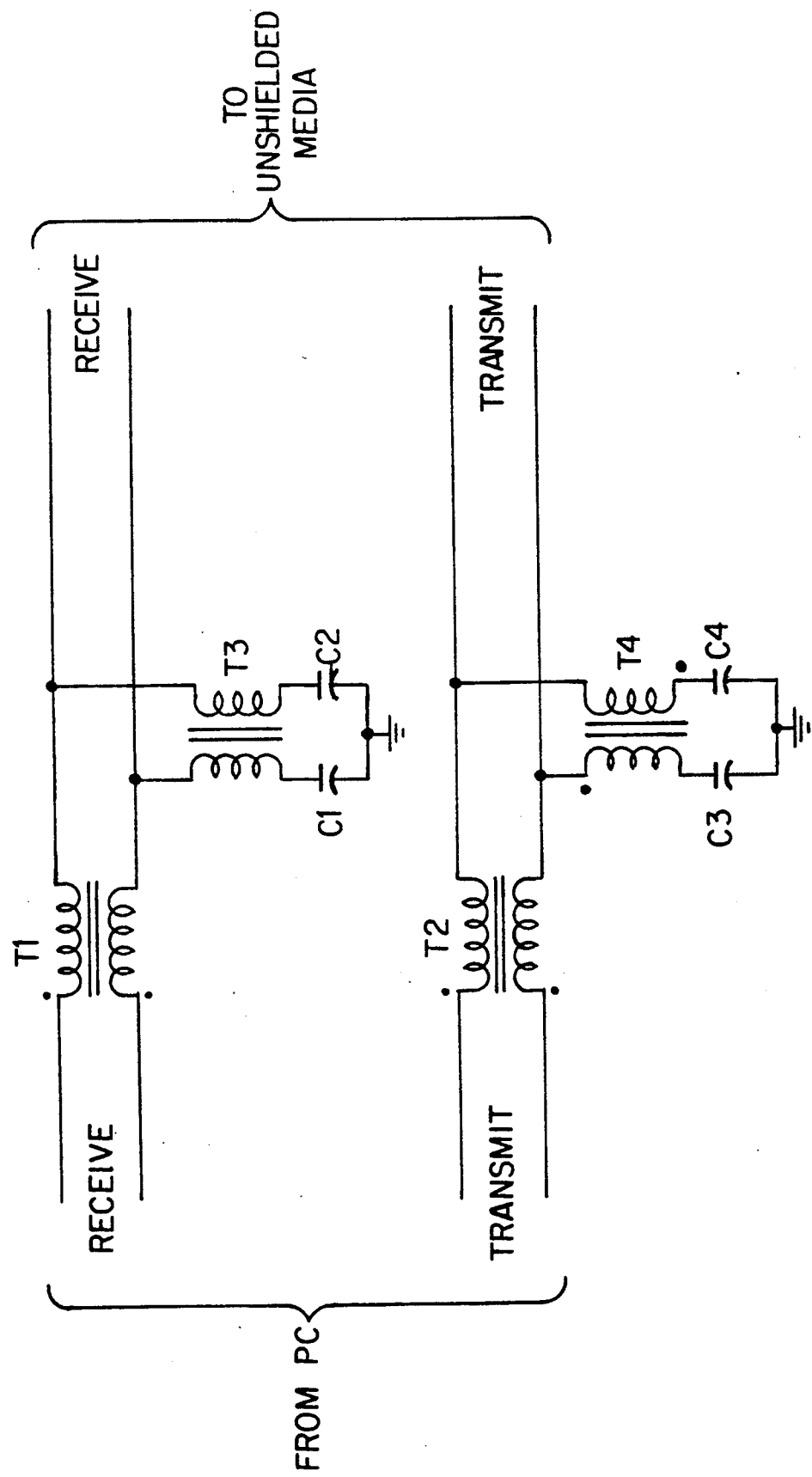

COMMUNICATION FILTER FOR UNSHIELDED, TWISTED-PAIR CABLE

FIELD OF THE INVENTION

The present invention relates generally to communication filters and, more particularly, concerns an electrical filter usable with twisted-pair cable to eliminate radio frequency and other radiation interference.

BACKGROUND OF THE INVENTION

Unshielded, twisted-pair cable of the type conventionally used for modular telephone lines is finding increased use for digital applications and particularly for local area network (LAN) systems. In addition, the recent introduction of the "10baseT" system for Ethernet networks is expected to a profound impact and may result in a substantial increase in the use of unshielded twisted-pair cable for data applications.

The use of unshielded twisted-pair cable instead of shielded cables and coaxial cables provides today's LAN user with substantial cost savings and flexibility. Not only is the twisted-pair cable substantially less expensive than the more traditional data cables, but in many instances existing telephone lines already include spare twisted pairs, so that required cable runs are already in place. This means that LANs can be installed and reconfigured as easily as telephone systems are reconfigured.

With the use of appropriate adapters, nearly all of the major LAN systems can operated on existing telephone cables. However, the absence of shielding in the cable presents an electromagnetic interference problem. High frequency components of the signals being transmitted in the cable can cause radiation into the environment, which can interfere with or otherwise affect other electronic or broadcast equipment. On the other hand, radiation from other equipment can produce interference with the unshielded cable, reducing the reliability of transmission and, in some instances, making effective transmission impossible. The FCC regulations on computer equipment define the limits of such emissions and interference.

Broadly, it is an object of the present invention to minimize or eliminate electromagnetic interference (EMI) in data transmission applications utilizing twisted-pair cable.

It is a specific object of the invention to provide a communication filter which provides EMI protection in LAN applications of twisted-pair cable.

It is also an object of the present invention to provide a communication filter providing EMI protection for twisted-pair cable applications, which filter is convenient and reliable in use, yet relatively inexpensive and simple in construction.

In accordance with a preferred embodiment demonstrating objects and features of the present invention, the data signal is transmitted differentially on two conductors constituting the twisted-pair cable, and a data filter is provided which includes an in-line transformer and a shunt transformer. The in-line transformer has a winding (i.e. the primary or secondary) in series with each line of the twisted pair. These windings are arranged so that they are wound in the same direction. Similarly, the shunt transformer includes a winding which shunts each wire of the twisted pair to ground through a series capacitor. These shunt windings are wound in opposite directions to each other. Owing to the manner in which the two transformers are wound, a data signal, which is applied differentially to the twisted pair will not be impeded by the in-line transformer, but will be impeded by the shunt transformer. A noise signal, such EMI, be introduced with the same polarity on both conductors of the twisted pair and will therefore experience the in-line transformer as a high impedance, whereas the shunt transformer will be low impedance, and the capacitor in series therewith will also be low impedance. Accordingly, noise signals are shunted to ground.

BRIEF DESCRIPTION OF THE DRAWING

The foregoing brief description, as well as further objects, features and advantages of the present invention will be understood more completely from the following detailed description of a presently preferred, but nonetheless illustrative embodiment, with reference being had to the accompanying drawing, in which the only figure is a circuit schematic diagram illustrating a preferred embodiment of the present invention.

DETAILED DESCRIPTION OF THE PREFERRED EMBODIMENT

The drawing illustrates a preferred embodiment of a filter in accordance with the present invention utilized between a personal computer (PC) and unshielded media, such as twisted-pair cable. The twisted-pair cable connects the PC to a network, such as a Token Ring network. This requires two twisted pairs, of which the upper pair is utilized for purposes of receiving, and the lower pair is utilized for purposes of transmitting. In-line transformers T1 and T2 are provided in each twisted pair so that one winding of the transformer (e.g. the primary or secondary) is in series with each lead of the twisted pair. The windings of the in-line transformers are wound in the same direction, as reflected by the dots appearing next to the windings for the transformer.

A shunt transformer is also provided on each twisted pair. One winding of the shunt transformer connects each twisted pair to ground through a corresponding capacitor (e.g. C1, C2 C3, and C4). The windings of the shunt transformers are wound opposite to each other, as reflected by the dots next to the respective windings.

A data signal will appear differentially between the two conductors of a twisted pair. Inasmuch as the windings of the in-line transformers are both wound in the same direction, the induced fields produced by the two windings as a result of signal current flow will cancel each other, and the in-line transformer will offer a low impedance to a data signal. Accordingly, a data signal will be passed through the filter and between the unshielded media and the PC. Also, any data signal current flowing through the shunt transformer would cause the windings to induce fields which add, so that the shunt transformer offers a high impedance to the differential signal.

Contrary to a data signal, a noise signal would appear in common mode or with the same polarity on each lead of the twisted pair. Accordingly, the fields induced in the two windings would tend to add, so that an in-line transformer offers a high impedance to a noise signal, which tends to block the signal from reaching the PC. At the same time, a noise signal would be common-mode and would induce fields in the shunt transformer which cancel each other, so that the shunt transformer offers a low impedance to noise signals. Also, the values of the capacitors C1, C2, C3 and C4 are selected to offer a low impedance to radios frequencies. Thus, radio frequency noise would be shunted to ground on the media side of the filter, in addition to being blocked by the high impedance of the in-line transformers.

Although a preferred embodiment of the invention has been disclosed for a illustrative purposes, those skilled in the art will appreciate that many additions, modifications, and substitutions are possible without departing from the scope and spirit of the invention as defined by the accompanying claims.

What is claimed is:

1. An electrical filter for a two-conductor cable designed to receive a data signal in differential form between the two conductors, comprising:

an in-line transformer having a primary winding and a secondary winding, each in an electrical series circuit with one of said conductors, said primary and secondary windings being wound in the same direction;

a shunt transformer having a primary and secondary winding wound in opposite directions, each of said windings having a first and second end, the first end of each winding being electrically connected to a different one of said conductors; and a pair of capacitors, each of said capacitors being connected between the second end of one of said shunt transformer windings and circuit ground.

* * * * *